(12) United States Patent
Ono (10) Patent No.: US 9,332,325 B2
(45) Date of Patent: May 3, 2016

(54) OPTICAL SWITCH

(71) Applicant: FDK CORPORATION, Tokyo (JP)

(72) Inventor: Hiroaki Ono, Tokyo (JP)

(73) Assignee: Kohoku Kogyo Co., Ltd., Nagahama-shi (JP)

( * ) Notice: Subject to any disclaimer, the term of this patent is extended or adjusted under 35 U.S.C. 154(b) by 1 day.

(21) Appl. No.: 14/534,984

(22) Filed: Nov. 6, 2014

(65) Prior Publication Data

US 2015/0131990 A1    May 14, 2015

(30) Foreign Application Priority Data

Nov. 12, 2013   (JP) ................................. 2013-234048

(51) Int. Cl.
*H04J 14/00*     (2006.01)
*H04Q 11/00*    (2006.01)

(52) U.S. Cl.
CPC ... *H04Q 11/0005* (2013.01); *H04Q 2011/0007* (2013.01)

(58) Field of Classification Search
CPC .......... H04Q 11/0001; H04Q 11/0003; H04Q 11/0005; H04Q 11/0062; H04Q 11/0066; H04Q 11/0067; H04Q 2011/0007
USPC ............................... 398/45, 50, 56
See application file for complete search history.

(56) References Cited

U.S. PATENT DOCUMENTS

| | | | | |
|---|---|---|---|---|
| 6,097,518 A * | 8/2000 | Wu | ................ | G02B 6/272 398/1 |
| 6,452,702 B1 * | 9/2002 | Wu | ................ | G02B 6/272 398/65 |
| 6,519,060 B1 * | 2/2003 | Liu | ................ | H04J 14/0206 398/49 |
| 6,600,582 B1 * | 7/2003 | Liu | ................ | G02B 6/272 398/48 |
| 6,879,746 B2 * | 4/2005 | Li | ................ | G02F 1/31 385/11 |
| 7,092,594 B2 * | 8/2006 | Yamamoto | ........ | G02B 6/2713 385/11 |
| 7,792,398 B2 * | 9/2010 | Tanaka | ........... | H04Q 11/0005 359/244 |
| 2005/0041908 A1 * | 2/2005 | Li | ................ | G02B 6/2766 385/16 |
| 2014/0139918 A1 * | 5/2014 | Hu | ................ | G02F 1/31 359/484.04 |

FOREIGN PATENT DOCUMENTS

| | | |
|---|---|---|
| JP | 06-051255 | 2/1994 |
| JP | 09-236784 | 9/1997 |
| JP | 2001-117060 | 4/2001 |
| JP | 2001-242420 | 9/2001 |
| JP | 2002-023103 | 1/2002 |
| JP | 2002-107670 | 4/2002 |
| JP | 2003-302604 | 10/2003 |

\* cited by examiner

*Primary Examiner* — M. R. Sedighian

(57) ABSTRACT

An optical switch includes: a first birefringent element; a first Faraday rotator; a first half-wave plate; a second birefringent element; a second half-wave plate; a second Faraday rotator; and a third birefringent element, which are arranged in a forward direction from the front, wherein the first birefringent element splits light in the forward direction from a first optical port into ordinary and extraordinary lights emitted onto first and second optical paths, respectively, the first and second half-wave plates are arranged on the first and second optical paths, respectively, and in the first and second Faraday rotators, a permanent magnetic field in a left-right direction and an external magnetic field in a front-back direction in an on state are applied to a Faraday element, a bidirectional optical path is formed between the first and second optical ports in an off state, and the optical path is interrupted in the on state.

4 Claims, 4 Drawing Sheets

FIG. 4A  FIG. 4B  FIG. 4C  FIG. 4D

OPTICAL SWITCH

CROSS-REFERENCE TO RELATED APPLICATION

This application claims the benefit of priority to Japanese Patent Application No. 2013-234048, filed Nov. 12, 2013, of which full contents are incorporated herein by reference.

BACKGROUND

1. Technical Field

The present disclosure relates to an optical switch and, more particularly, to an optical switch capable of providing connection and interruption of an optical path using a Faraday rotator.

2. Description of the Related Art

An optical switch is an optical device configured to perform operations of interrupting an optical path formed between two optical ports, which serve as input and output ports for a light beam, and switching the optical path by switching the optical port to another port. Incidentally, the optical switch may have a bidirectional switching function capable of transmission and interruption of light bi-directionally between the optical ports arranged at both ends of the optical path. The bidirectional switching function is such a function that, for example, in the case of providing two optical ports opposed to each other, while in the state where an optical path from one optical port to the other is formed, the light emitted from the other optical port can be made incident on the one optical port, which is an optical path in the opposite direction.

The optical switch having the bidirectional switching function includes a mechanical type. As the mechanical optical switch, known are, for example, the one configured to drive an optical fiber itself of one optical port using an electromagnetic actuator, the one configured to actuate a prism in to or out of an optical path between two optical ports, and the like, in order to provide connection and interruption of the optical path between the optical ports. Further, another mechanical type is the one configured to switch the optical path by changing minute angle of a mirror using the known MEMS (Micro Electro Mechanical Systems). Note that an optical switch using a prism is described in Japanese patent application laid-open publication Nos. 9-236784 and 6-51255. Further, the techniques relating to an embodiment of the present disclosure are described in Japanese patent application laid-open publications Nos. 2001-117060, 2001-242420, 2002-023103, 2002-107670, and 2003-302604.

The optical switch having a bidirectional switching function has a possibility, in the future, of being used for optical communications and the like using lights having different wavelengths between one direction from one optical port to the other and the opposite direction from the other to the one. Then, the optical switch provided in an optical communication network requires high-speed responsivity and also reliability and durability with less failure and aging deterioration.

The above described mechanical optical switch has problems relating to reliability and durability, such as failure and malfunction caused by contamination of foreign matter, aging deterioration caused by wear, or the like, since movable parts are included. As is well known, mechanical systems other than MEMS require a response time for switching of about several milliseconds, which causes a problem with high-speed responsivity. The MEMS generally requires a response time of about 0.5 milliseconds, and thus is also hardly said to have extremely high-speed responsivity.

Then, an optical switch of a magneto-optical system using a Faraday rotator can be considered. As is well known, the Faraday rotator is an optical component, in which the magnetic field produced by a permanent magnet or an electromagnet is applied to a Faraday element configured with a magneto-optical material such as $Y_3Fe_5O_{12}$ (YIG), and the component configured to rotate the polarization plane of the light traveling in the direction of the above magnetic field. In the magneto-optical system, for example, it is possible to provide connection, interruption, and switching, of an optical path between specific optical ports by configuring an optical circulator described in Japanese patent application laid-open publication No. 2001-117060. The Faraday rotator does not have a movable part or a movable mechanism, and problems such as mechanical aging deterioration caused by failure, wear and the like do not occur in principle. The response time is about 10 to 100 milliseconds, and various optical devices using the Faraday rotators are actually provided for an optical communication use.

However, the Faraday rotator is a nonreciprocal element, and an optical switch using a Faraday rotator and having a bidirectional switching function, is not in existence.

SUMMARY

An optical switch according to an aspect of the present disclosure includes:

a first birefringent element;

a first Faraday rotator including a Faraday element made of a magneto-optical material, two permanent magnets, and an electromagnet;

a first half-wave plate;

a second birefringent element;

a second half-wave plate;

a second Faraday rotator including a Faraday element made of a magneto-optical material, two permanent magnets, and an electromagnet; and a third birefringent element, wherein the first birefringent element, the first Faraday rotator, the first half-wave plate, the second birefringent element, the second half-wave plate, the second Faraday rotator, and the third birefringent element, each having light-incident/emission end surfaces at front and back thereof, are arranged in this order on an optical path in a forward direction from front to back, the first birefringent element and the third birefringent element are arranged such that optical axes thereof extend from left front toward right rear, and the second birefringent element is arranged such that an optical axis thereof extends from upper front toward lower rear, when relative up-down and left-right directions, orthogonal to a front-back direction, are defined, the two permanent magnets each in a plate shape are respectively mounted to left and right side surfaces of the Faraday element such that different magnetic poles are opposed to each other, and the permanent magnets are configured to apply a permanent magnetic field to the Faraday element in one of a left direction and a right direction, the electromagnet is configured to apply an external magnetic field to the Faraday element in one of a front direction and a back direction, the first birefringent element is configured to, when a light beam in the forward direction from a first optical port, arranged in front of the first birefringent element, is made incident on a first position in the front end surface thereof, split the light beam into ordinary light and extraordinary light in left and right directions; emit a light beam corresponding to the ordinary light onto a first optical path; and emit a light beam corresponding to the extraordinary light onto a second optical path, the third birefringent element is configured to, when a light beam in a reverse direction from a second optical port, arranged behind the third birefringent element, is made incident on a second position in the back end surface thereof, split the light beam into ordinary light and extraordinary light in the left and right directions; emit a light beam corresponding to the ordinary light onto the second optical path; and emit a light beam corresponding to the extraordinary light onto the first optical path, the first half-wave plate is arranged on the first optical path, the second half-wave plate is arranged on the second optical path, the first Faraday rotator and the second Faraday rotator each are configured to emit a light beam, incident thereon from one of the forward direction and the reverse direction, without rotating a polarization plane of the light beam, in an off state in which an external magnetic field in one of the front direction and the back direction produced by the electromagnet is not being applied to the Faraday element; and emit a light beam, incident thereon from one of the forward direction and the reverse direction, with a polarization plane of the light beam having been rotated 90 degrees in one of a left direction and a right direction around an axis along the front-back direction, in an on state in which the external magnetic field in one of the front direction and the back direction is being applied to the Faraday element, in the off state, the light beams respectively following the first optical path and the second optical path in the forward direction are coupled at the second position and enter the second optical port, and the light beams respectively following the first optical path and the second optical path in the reverse direction are coupled at the first position and enter the first optical port, so that a bidirectional optical path is formed between the first optical port and the second optical port, and in the on state, the light beams respectively following the first optical path and the second optical path in the forward direction are coupled at a third position different from the second position, and the optical path between the first optical port and the second optical port is interrupted.

The optical switch may be configured such that in the on state, the light beam in the forward direction from the first optical port enters a third optical port arranged behind the third position of the third birefringent element, and a light beam in the reverse direction from the third optical port enters the first optical port, so that a bidirectional optical path is formed between the first optical port and the third optical port.

The optical switch may include the Faraday element configured such that an even number of magneto-optical crystal films are laminated in the front-back direction, and the magneto-optical crystal films adjacent to each other are laminated in such a manner as to have crystal faces forming 180 degrees with respect to each other.

Other features of the present disclosure will become apparent from descriptions of the present specification and of the accompanying drawings.

BRIEF DESCRIPTION OF THE DRAWINGS

For more thorough understanding of the present disclosure and advantages thereof, the following description should be read in conjunction with the accompanying drawings, in which.

DETAILED DESCRIPTION OF THE DISCLOSURE

An embodiment of the present disclosure will be described hereinafter with reference to attached drawings. Note that in the drawings used for the following description, the same or similar parts are referred to as the same reference numerals and the duplicate description thereof may be omitted. The reference numerals which are unnecessary for explanations may be omitted depending on figures.

Configuration of Optical Switch

Figures 1A, 1B, 1C:
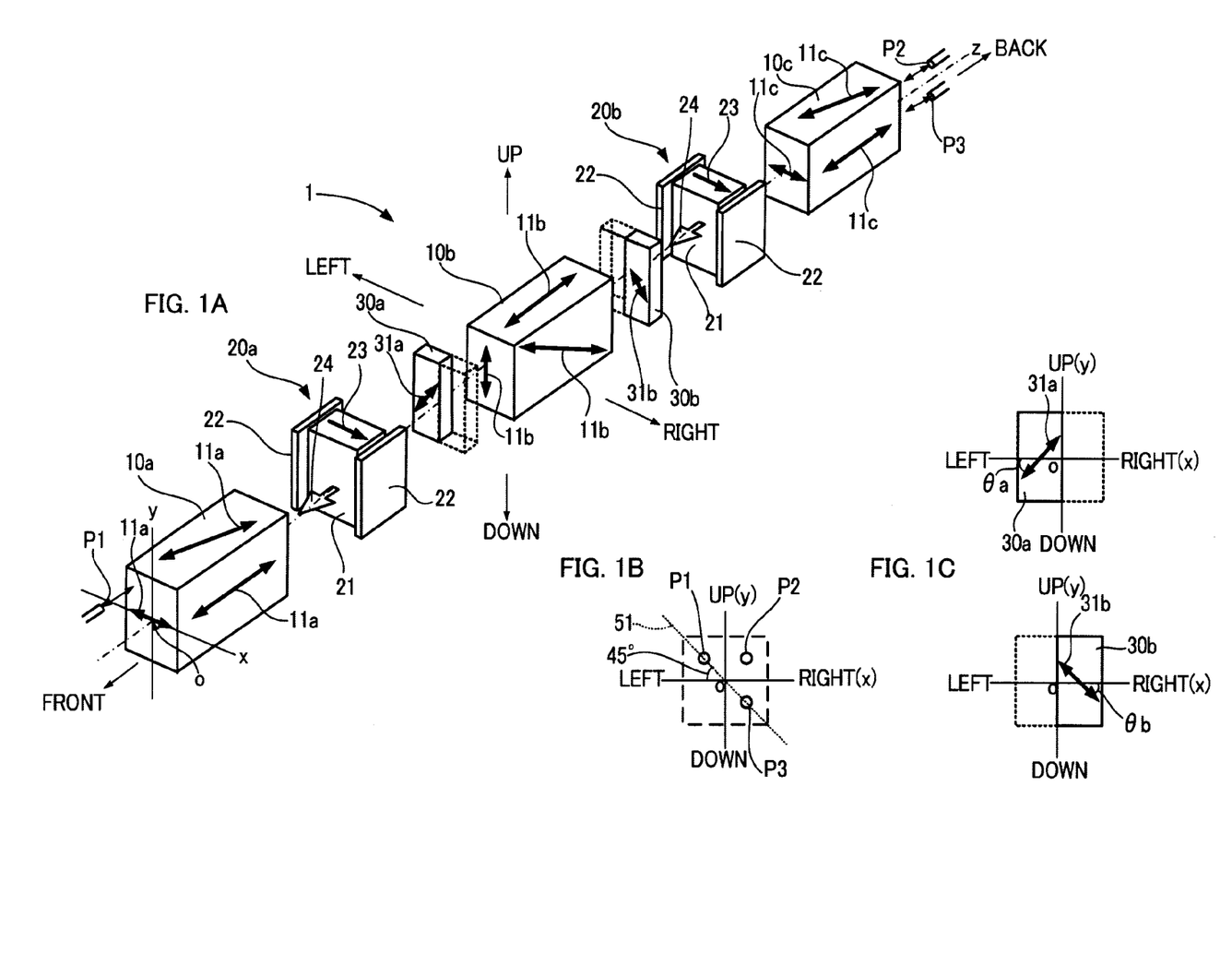
FIG. 1A is a diagram illustrating an outline configuration of an optical switch according to an embodiment of the present disclosure.
FIG. 1B is a diagram illustrating the positions of first to third optical ports through which optical signals are inputted/outputted to/from the optical switch according to the embodiment of the present disclosure.
FIG. 1C is a diagram illustrating the directions of optical axes of half-wave plates included in the optical switch according to the embodiment of the present disclosure.

An optical switch according to an embodiment of the present disclosure includes a bidirectional switching function using a Faraday rotator which is a nonreciprocal element. FIGS. 1A to 1D illustrate a configuration of an optical switch 1 according to the embodiment of the present disclosure. FIG. 1A is a perspective view illustrating the configuration of the optical switch 1, and FIG. 1B illustrates the positions of first to third optical ports (P1-P3) through which optical signals are inputted/outputted to/from the optical switch 1. FIG. 1C illustrates the directions of optical axes (31a, 31b) of half-wave plates (30a, 30b) constituting the optical switch 1.

The optical switch 1 is configured such that, assuming that the traveling direction of a light beam is referred to as a front-back direction, a first birefringent element 10a, a first Faraday rotator 20a, a first half-wave plate 30a, a second birefringent element 10b, a second half-wave plate 30b, a second Faraday rotator 20b, and a third birefringent element 10c are arranged in the order from the front toward the back, as shown in FIG. 1A. The optical components (10a, 20a, 30a, 10b, 30b, 20b, 10c) constituting the optical switch 1 each have incident/emission surfaces on a front surface and a back surface thereof.

The first to the third birefringent elements (10a-10c) are substantially the same, and made of rutile single crystal or the like. The first and the third birefringent elements (10a, 10c) have optical axes (11a, 11c) in the same direction. Here, the direction of the optical axes (11a, 11c) of the first and the third birefringent elements (10a, 10c) when viewed from the front is referred to as a left-right direction, and the direction orthogonal to the left-right direction and the front-back direction is referred to as an up-down direction. Note that each of the left and right directions is defined by the direction when viewed from the front.

The optical axes (11a, 11c) of the first and the third birefringent elements (10a, 10c) coincide with the front-back direction when viewed from the left-right direction, and the axes are also in the direction extending from left front to right rear when viewed from the up-down direction. An optical axis 11b of the second birefringent element 10b coincides with the direction obtained by rotating either the first or the third birefringent element (10a, 10c) 90 degrees to the right about the front-back direction. It should be noted here that each of the up and down directions is defined assuming that the optical axis 11b of the second birefringent element 10b extends from the upper front to the lower rear when viewed from the left-right direction. Further, xyz coordinates of a left-handed system with a z-axis set in the front-back direction are defined, where the left-right direction is set as an x-axis and the up-down direction is set as a y-axis.

The x, y, and z axes are set with respect to the positions of the first to the third optical ports (P1-P3). In specific, as illustrated in FIG. 1A, it is assumed that, in the three optical ports (P1-P3) configured with optical fiber collimators or the like, the first optical port P1 is arranged in front of the optical switch 1, and the second optical port P2 and the third optical port P3 are arranged therebehind. Further, as illustrated in FIG. 1B, it is assumed that the first optical port P1 and the second optical port P2 are arranged such that the positions thereof are symmetrical to each other with respect to the y-axis with the first optical port P1 being set on the upper side, when viewed from the front. It is assumed that the second optical port P2 and the third optical port P3 are arranged such that the positions thereof are symmetrical to each other with respect to the x-axis. As such, the x-axis and the y-axis are defined on the basis of the positions of the optical ports (P1-P3).

The z-axis, that is the origin point o in an x-y plane, is defined assuming that a straight line 51 connecting the first optical port P1 and the third optical port P3 is in a direction at an angle of 45 degrees with respect to the x-axis and the y-axis, and further the first optical port P1 and the third optical port P3 are arranged at positions symmetrical with respect to the origin point o, when viewed from the front. Subsequently, the optical components (20a, 20b, 30a, 30b) other than the birefringent elements (10a-10c) will be described.

Figure 2A:
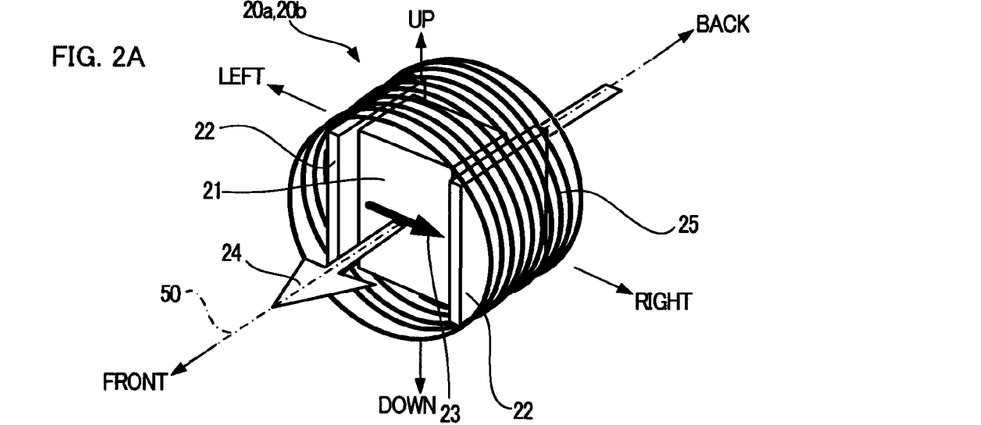
FIG. 2A is a diagram illustrating a configuration of a Faraday rotator constituting the optical switch according to the embodiment of the present disclosure.
Figure 2B:
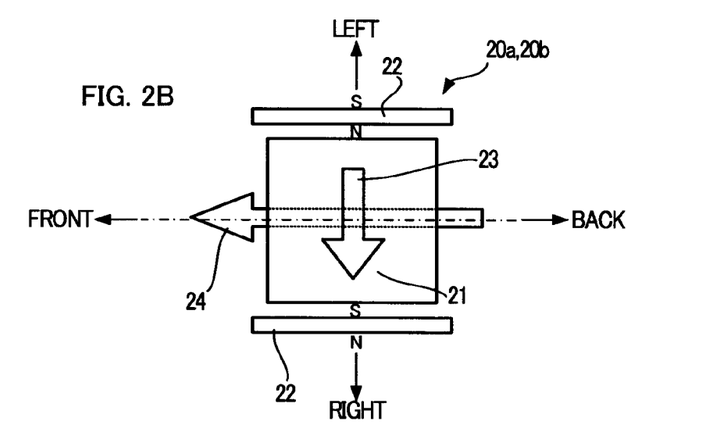
FIG. 2B is a diagram illustrating the directions in which a permanent magnetic field and an external magnetic field are applied to the Faraday element.
Figure 2C:
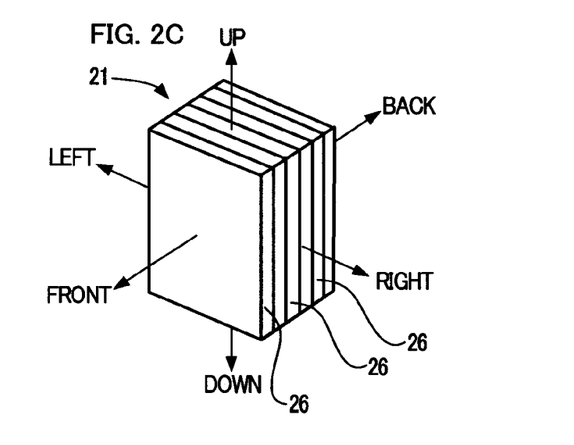
FIG. 2C is a diagram illustrating an example of a configuration of the Faraday element included in the Faraday rotator.

The first and the second Faraday rotators (20a, 20b) are substantially the same, and each includes: permanent magnets 22 configured to apply a permanent magnetic field 23 in a direction (left-right direction) parallel to the x-axis to the Faraday element 21 which is made of a magneto-optical material; and an electromagnet configured to apply a magnetic field (hereinafter, also referred to as an external magnetic field) 24 in the z-axis direction (front-back direction) to the Faraday element 21. Further, it is assumed that the first and the second Faraday rotators (20a, 20b) are applied with the permanent magnetic fields 23 of the same intensity and the external magnetic fields 24 of the same intensity. FIGS. 2A to 2C illustrate a schematic configuration of the Faraday rotator (20a, 20b) according to the embodiment of the present disclosure. FIG. 2A is an external view of the Faraday rotator (20a, 20b), and FIG. 2B is a diagram illustrating the directions in which the permanent magnetic field 23 and the external magnetic field 24 are applied to the Faraday element 21. FIG. 2C is a diagram illustrating a configuration example of the Faraday element 21 constituting the Faraday rotator (20a, 20b). As illustrated in FIG. 2A, the Faraday rotator (20a, 20b) in the embodiment of the present disclosure includes: the Faraday element 21 in a rectangular parallelepiped shape made of a magneto-optical material; the permanent magnets configured to apply the permanent magnetic field to the Faraday element 21; and a coil 25 configured to enable application of the external magnetic field to the Faraday element 21 by driving an external drive circuit (not shown).

In specific, the permanent magnets 22 each in a plate shape are arranged on the left and the right side surfaces of the Faraday element 21, respectively, such that different magnetic poles are opposed to each other, and the two permanent magnets 22 apply the permanent magnetic field 23 in one of the left direction and the right direction to the Faraday element 21 as a bias magnetic field for magnetically saturating the Faraday element 21. In the embodiment of the present disclosure, the left and the right surfaces of the permanent magnet 22 each in a plate shape are magnetized so that a permanent magnetic field is applied to the Faraday element 21 from the left toward the right. Further, the permanent magnets 22 are mounted to the side surfaces of the Faraday element 21 using an adhesive or the like, practically.

The coil 25 is formed by winding a conductor around the Faraday element 21 with the z-axis direction being taken as an axis thereof. In the embodiment of the present disclosure, by energizing the coil 25, the external magnetic field 24 is applied to the Faraday element 21 from the back to the front. Then, the Faraday rotator (20a, 20b) is operated such that linearly-polarized light incident from either the front or the back is rotated clockwise when viewed from the front while the external magnetic field is being applied. As a matter of course, the external magnetic field 24 in the front direction or the back direction can be applied to the Faraday element 21, not by the coil 25 formed with the Faraday element 21 itself being used as a winding axis, but by coils with their axes set in the z-axis direction arranged in front of and behind the Faraday element 21.

In the embodiment of the present disclosure, the Faraday element 21 is not configured with a single magneto-optical material but, as illustrated in FIG. 2C, an even number of magneto-optical crystal films 26 in a plate shape are laminated in the front-back direction, and the magneto-optical crystal films 26, adjacent to each other in the front-back direction, have crystal orientation directions opposite to each other (have crystal faces forming 180 degrees with respect to each other). Thereby, even though a great magnetic field cannot be produced by the permanent magnet 22 in a thin plate shape, the magneto-optical crystal films 26 can almost be magnetically saturated. Further, although each of the magneto-optical crystal films 26 is not completely magnetically saturated, the Faraday element 21 as a whole is brought into a substantially magnetically saturated state. As a matter of course, the permanent magnet 22 in a plate shape capable of producing a great magnetic field and/or the magneto-optical material with very high Verdet's constant makes it possible to form the Faraday element 21 in an integrated manner. In any case, a configuration only has to be such that the permanent magnetic field is applied in the x-axis direction by the permanent magnet 22, and the polarization plane of the incident linearly-polarized light is rotated by the external magnetic field in the z-axis direction.

The first and the second half-wave plates (30a, 30b) are arranged, as illustrated in FIG. 1C, such that the directions of the optical axes thereof (31a, 31b) have an angle of 45 degrees with respect to the x-axis (y-axis) in the x-y plane. Further, the first half-wave plate 30a and the second half-wave plate 30b are arranged to be symmetrical to each other with respect to the y-axis. In this example, the first half-wave plate 30a is arranged on the left with respect to the y-axis, and the second half-wave plate 30b is arranged on the right with respect thereto. The optical switch 1 according to the embodiment of the present disclosure has the above described configuration, and is configured to perform operations of forming an optical path among the first to the third optical ports P1-P3 arranged in front of and behind the switch, and interrupting the optical path.

Operation of Optical Switch

Off State

Figure 3A:
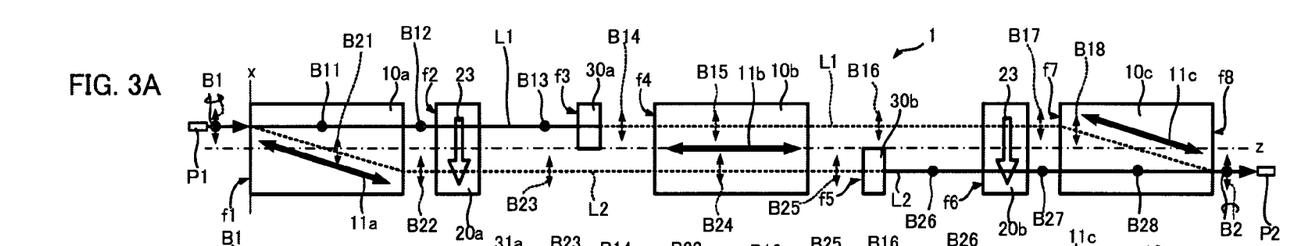
FIG. 3A is a diagram illustrating an optical path in a forward direction when the optical switch in an off state according to the embodiment of the present disclosure is viewed from above.
Figure 3B:
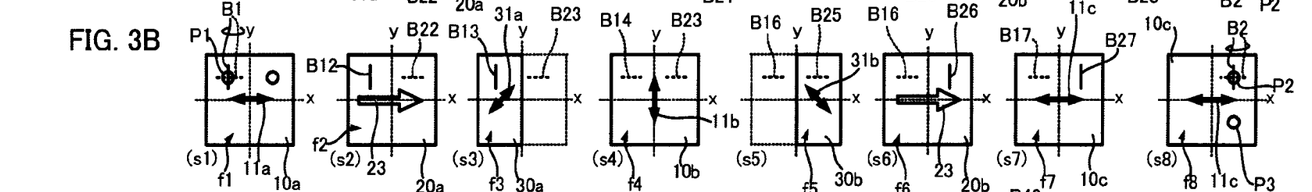
FIG. 3B is a diagram of the optical path illustrated in FIG. 3A when viewed from the front.

FIGS. 3A to 3D illustrate operations of connecting the first optical port P1 and the second optical port P2 with an optical path, in the optical switch 1 according to the embodiment of the present disclosure. FIG. 3A illustrates an optical path in a forward direction from the first optical port P1 to the second optical port P2 when the optical switch 1 is viewed from above. FIG. 3B is a diagram of the optical path illustrated in FIG. 3A when viewed from the front, and illustrates the positions and the polarization states of a light beam (hereinafter, also referred to as a beam or light). In specific, the incident positions of beams (B1, B12-B14, B16, B17, B22, B23, B25-B27) in the front surfaces (f1-f7) of the first birefringent element 10a, the first Faraday rotator 20a, the first half-wave plate 30a, the second birefringent element 10b, the second half-wave plate 30b, the second Faraday rotator 20b, and the third birefringent element 10c, when viewed from the front; the emitting position of the beam B2 in a back surface f8 of the third birefringent element 10c; and the changes in the direction of oscillation, are illustrated in the order from s1 to s8.

Figure 3C:
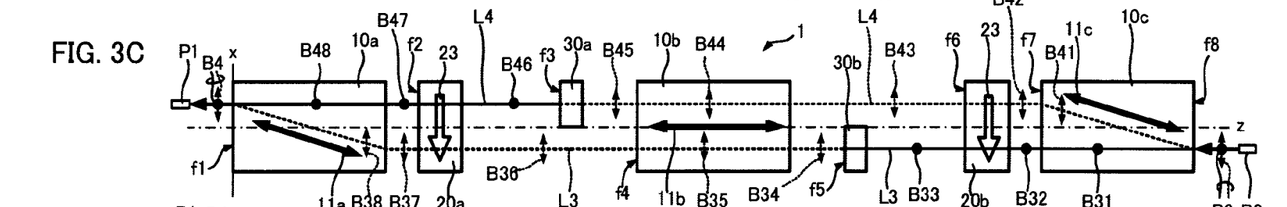
FIG. 3C is a diagram illustrating an optical path in a reverse direction when the optical switch in the off state according to the embodiment of the present disclosure is viewed from above.
Figure 3D:
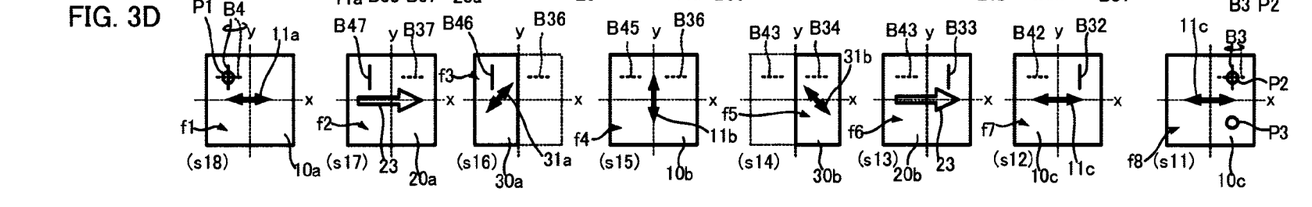
FIG. 3D is a diagram of the optical path illustrated in FIG. 3C when viewed from the front.

Further, FIG. 3C illustrates an optical path in a reverse direction from the second optical port P2 to the first optical port P1 when the optical switch 1 is viewed from above, and FIG. 3D illustrates the positions and the polarization states of light beams (B3, B32-B34, B36, B37, B42, B43, B45-B47, B4) in the above described surfaces (f1-f8) when the optical path is viewed from the front, in the order from s11 to s18.

In the optical switch 1 according to the embodiment of the present disclosure, while in the state where the external magnetic field is not being applied to the first or the second Faraday rotators (20a, 20b) (hereinafter, also referred to as an off state), the outgoing light B1 from the first optical port P1 enters the second optical port P2 as the outgoing light B2, and the optical path in the forward direction from the first optical port P1 to the second optical port P2 is formed. At the same time, the outgoing light B3 from the second optical port P2 enters the first optical port P1 as the outgoing light B4, and the optical path in the reverse direction from the second optical port P2 to the first optical port P1 is formed, and thus the optical path is connected in both the directions.

First, as illustrated in FIGS. 3A and 3B, when the optical path in the forward direction in the off state is followed, the light beam B1 (s1) emitted from the first optical port P1 is split into ordinary light B11 and extraordinary light B21 by the first birefringent element 10a. The ordinary light B11 oscillates in the up-down (y-axis) direction orthogonal to the optical axis 11a of the first birefringent element 10a when viewed from the front, and the extraordinary light B21 oscillates in the x-axis direction in such a manner as to be parallel to the optical axis 11a. Further, the extraordinary light B21 is refracted and emitted from the position different from the position from which the ordinary light B11 is emitted. In the first birefringent element 10a in the embodiment of the present disclosure, the direction and the length in the front-back direction and the like of the optical axis 11a are set such that the extraordinary light B21 is emitted from the position which is symmetrical, with respect to the y-axis, to the position from which the ordinary light B11 is emitted. Note that, hereinafter, the optical path that is and will be followed by the ordinary light B11 in the first birefringent element 10a is referred to as a first optical path L1, and the optical path that is and will be followed by the extraordinary light B21 is referred to as a second optical path L2.

Each of the beams (B12, B22) emitted from the first birefringent element 10a enters the first Faraday rotator 20a (s2). The first Faraday rotator 20a is in the off state, and is magnetically saturated by the permanent magnetic field 23 in the left-right direction. That is, the linearly-polarized light incident in the front-back direction is emitted without rotating its polarization plane (hereinafter, also referred to as the direction of oscillation), and the outgoing lights (B12, B22) from the first birefringent element 10a reach the position of the first half-wave plate 30a with the directions of oscillation thereof being maintained (s3). The first half-wave plate 30a is arranged only on the left side with respect to the y-axis, and lies only on the first optical path L1. Thus, the light B13 emitted from the first Faraday rotator 20a to the first optical path L1 is rotated 90 degrees in its direction of oscillation, and is emitted from the first half-wave plate 30a as the light B14 oscillating in the x-axis direction. On the other hand, the first half-wave plate 30a does not lie in the light B23 traveling along the second optical path L2, and the light enters the second birefringent element 10b with its direction of oscillation being maintained (s4).

The optical axis 11b of the second birefringent element 10b is in the y-axis direction when viewed from the front, and both the lights (B14, B23), which follow the first and the second optical paths (L1, L2) and enter the second birefringent element 10b, oscillate in the x-axis direction. Thus, the lights (B15, B24), which pass through the second birefringent element 10b and follow the two optical paths (L1, L2), pass through the same positions as the positions which the incident lights (B14, B23) pass through with the directions of oscillation thereof being maintained, when viewed from the front. That is, the outgoing lights (B16, B25) from the second birefringent element 10b reach the position of the second half-wave plate 30b, with the same position and directions of oscillation thereof as those of the incident lights (B14, B23) being maintained (s5).

The second half-wave plate 30b is arranged only on the right with respect to the y-axis, and lies only on the second optical path L2. Thus, only the light B25 following the second optical path L2 out of the lights (B16, B25) that are emitted from the second birefringent element 10b is rotated 90 degrees in its direction of oscillation, is emitted from the second half-wave plate 30b as light B26 oscillating in the y-axis direction, and the light B26 and the light B16 emitted from the second birefringent element 10b enter the second Faraday rotator 20b (s6). Since the second Faraday rotator 20b is also in the off state, the incident lights (B16, B26) are emitted from the same positions as the incident positions in the x-y plane without changing the directions of oscillation thereof. Then, the outgoing lights (B17, B27) enter the third birefringent element 10c (s7).

The optical axis 11c of the third birefringent element 10c is in the same direction as that of the first birefringent element 10a, is parallel to the x-axis when viewed from the front, and runs from left front toward right rear in the z-x plane. Thus, the light B17 oscillating in the x-axis direction on the first optical path L1 is refracted toward the right rear direction as extraordinary light B18, and the light B27 on the second light path L2 oscillating in the y-axis direction travels, as it is, in a straight line as ordinary light B28. Thereby, the two lights (B17, B27) having entered the third birefringent element 10c are emitted as the light B2 that is acquired by coupling the ordinary light B28 and the extraordinary light B18 at the back end surface f8 of the third birefringent element 10c (s8). Then, the second optical port P2 is arranged behind this coupling position, and the optical path in the forward direction leading from the first optical port P1 to the second optical port P2 is formed.

On the other hand, the optical path in the reverse direction, as illustrated in FIGS. 3C and 3D, when the light B3 emitted forward from the second optical port P2 enters the third birefringent element 10c (s11), the light B3 is split by the birefringent element 10c into ordinary light B31 and extraordinary light B41. The ordinary light B31 oscillates in the y-axis direction orthogonal to the optical axis 11c of the third birefringent element 10c when viewed from the front, and the extraordinary light B41 oscillates in the x-axis direction in such a manner as to be parallel to the optical axis 11c. Then, the extraordinary light B41 is refracted and emitted from the position different from the position from which the ordinary light B31 is emitted (s12). Then, the positions from which the ordinary light B31 and the extraordinary light B41 are emitted are respectively the same as the positions on which the beams following the second optical path L2 and the first optical path L1 in the forward direction are made incident in the third birefringent element 10c.

Hereinafter, it is assumed that the optical path that is and will be followed by the ordinary light B31 in the third birefringent element 10c is referred to as a third optical path L3, and that the optical path that is and will be followed by the extraordinary light B41 is referred to as a fourth optical path L4. The second Faraday rotator 20b, the second half-wave plate 30b, the second birefringent element 10b, the first Faraday rotator 20a, and the first birefringent element 10a are arranged on the third optical path L3 in the order from the back to the front. The second Faraday rotator 20b, the second birefringent element 10b, the first half-wave plate 30a, the first Faraday rotator 20a, and the first birefringent element 10a are arranged on the fourth optical path L4 in the order from the back to the front.

As described above, in the off state, the first and the second Faraday rotators (20a, 20b) do not change the directions of oscillation of the lights passing therethrough in the reverse direction (B32→B33, B42→B43, B36→B37, B46→B47). Thus, the third and the fourth optical paths (L3, L4) respectively follow the second and the first optical paths (L2, L1) in the direction opposite to the forward direction. That is, the light B3 emitted from the second optical port P2 enters the first birefringent element 10a by way of the lights B31-B37 through the third optical path L3, and also enters the first birefringent element 10a by way of the lights B41-B47 (s11-s17) through the fourth optical path L4. Then, at this time, the light B37 oscillating in the x-axis direction and following the third optical path L3 is refracted to the first optical port P1 side as extraordinary light B38. The light B47 oscillating in the y-axis direction and following the fourth optical path L4 travels, as it is, in a straight line. Thus, the ordinary light B48 and the extraordinary light B38 are coupled at the front end surface f1 of the first birefringent element 10a (s18). Then, the coupled light B4 enters the first optical port P1, and the optical path in the reverse direction is formed between the second optical port P2 and the first optical port P1. That is, in the off state, the optical switch 1 operates so that the optical path is connected between the first optical port P1 and the second optical port P2 in both the forward and the reverse directions. Next, an operation of interrupting the optical path between the first optical port P1 and the second optical port P2 will be described.

<On State>

In the optical switch 1 according to the embodiment of the present disclosure, when the Faraday elements 21 of the first and the second Faraday rotators (20a, 20b) are brought into a state where the external magnetic field is being applied thereto (hereinafter, also referred to as an on State), the optical path between the first optical port P1 and the second optical port P2 is interrupted. Further, in the on state, the optical path is formed between the first optical port P1 and the third optical port P3 in both the directions.

Figures 4A, 4B, 4C:
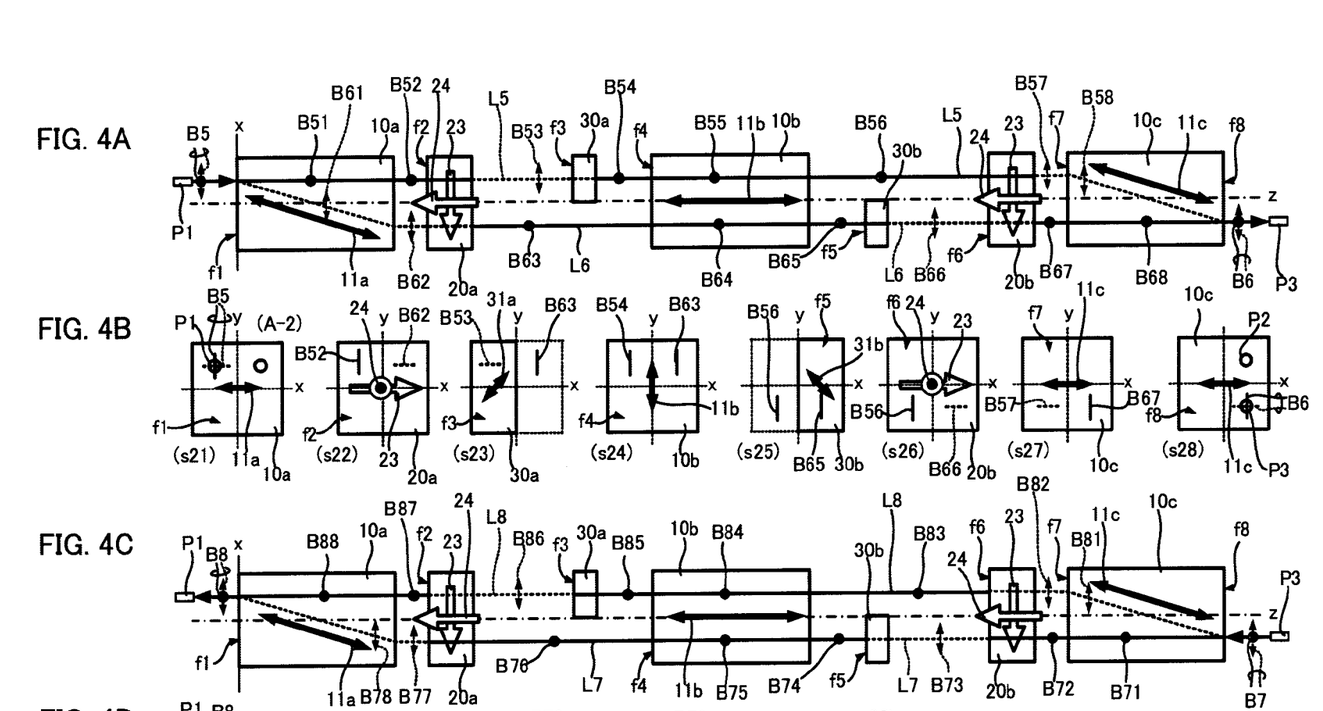
FIG. 4A is a diagram illustrating an optical path in the forward direction when the optical switch in an on state according to the embodiment of the present disclosure is viewed from above.
FIG. 4B is a diagram of the optical path illustrated in FIG. 4A when viewed from the front.
FIG. 4C is a diagram illustrating an optical path in a reverse direction when the optical switch in the on state according to the embodiment of the present disclosure is viewed from above.
Figure 4D:
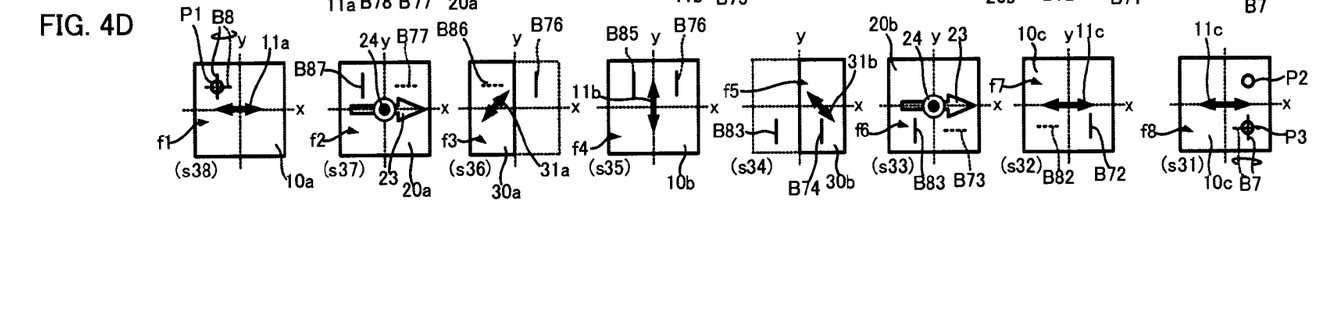
FIG. 4D is a diagram of the optical path illustrated in FIG. 4C when viewed from the front.

FIGS. 4A to 4D illustrate operations of the optical switch 1 in the on state, and FIG. 4A illustrates the optical path in the forward direction from the first optical port P1 to the third optical port P3 when the optical switch 1 is viewed from above. FIG. 4B is a diagram of the optical path illustrated in FIG. 4A when viewed from the front, and illustrates the positions and the changes in the directions of oscillation of the beams (B5, B6, B52-B57, B62-B67) in the front surfaces or the back surfaces (f1-f8) of the optical components (10a-10c, 20a, 20b, 30a, 30b) in the order from s21 to s28. Further, FIG. 4C illustrates the optical path in the reverse direction from the third optical port P3 to the first optical port P1 when the optical switch 1 is viewed from above, and FIG. 4D illustrates the positions and the changes in the directions of oscillation of the beams (B7, B8, B72-B77, B82-B87) in the surfaces (f1-f8) when the optical path is viewed from the front, in the order from s31 to s38.

First, the optical path in the forward direction in the on state will be described. As illustrated in FIGS. 4A and 4B, the light beam B5 emitted from the first optical port P1 enters the first birefringent element 10a (s21), and is split into ordinary light B51 and extraordinary light B61. The ordinary light B51 oscillates in the y-axis direction in such a manner as to be orthogonal to the optical axis 11a of the first birefringent element 10a when viewed from the front, and the extraordinary light B61 oscillates in the x-axis direction in such a manner as to be parallel to the optical axis 11a. The extraordinary light B61 is refracted and emitted from the position different from the position from which the ordinary light B51 is emitted. Hereinafter, the optical path that is and will be followed by the ordinary light B51 in the forward direction in the first birefringent element 10a is referred to as a fifth optical path L5, and the optical path that is and will be followed by the extraordinary light B61 is referred to as a sixth optical path L6.

On the fifth optical path L5, the first Faraday rotator 20a, the first half-wave plate 30a, the second birefringent element 10b, the second Faraday rotator 20b, and the third birefringent element 10c lie in this order. On the sixth optical path L6, the first Faraday rotator 20a, the second birefringent element 10b, the second half-wave plate 30b, the second Faraday rotator 20b, and the third birefringent element 10c lie in this order.

Each of the two beams (B52, B62) emitted from the first birefringent element 10a enters the first Faraday rotator 20a (s22). The first Faraday rotator 20a is in the on state, and is applied with the external magnetic field 24 in the z-axis direction. In the present example, the first and the second Faraday rotators (20a, 20b) are set to operate so that the linearly-polarized light is rotated 90 degrees clockwise, when viewed from the front, due to the magnetic field 24 in the z-axis direction, even if the linearly-polarized light enters either from the front or the back. Further, in the embodiment of the present disclosure, since both the linearly-polarized lights incident on the first and the second Faraday rotators (20a, 20b) oscillate in the x-axis direction or the y-axis direction, the incident light oscillating in the x-axis direction is emitted as the light oscillating in the y-axis direction, and the incident light oscillating in the y-axis direction is emitted as the light oscillating in the x-axis direction. Thus, the two lights (B52, B62) having entered the first Faraday rotator 20a are emitted backward as the lights (B53, B63) whose directions of oscillation having been exchanged each other, and reach the position of the first half-wave plate 30a (s23).

Since the first half-wave plate 30a lies only on the fifth optical path L5, the light B53, which follows the fifth optical path L5 and is emitted from the first Faraday rotator 20a, is rotated 90 degrees in its direction of oscillation, is emitted from the first half-wave plate 30a as light B54 oscillating in the y-axis direction, and enters the second birefringent element 10b. On the other hand, the light B63 following the sixth optical path L6 enters the second birefringent element 10b with its oscillation state in the y-axis direction being maintained (s24).

In the optical axis 11b of the second birefringent element 10b, the direction of projection onto the x-y plane is the y-axis direction, and the lights (B54, B63) oscillating in the y-axis direction and following the fifth and the sixth optical paths (L5, L6) enter the second birefringent element 10b, and act as extraordinary lights (B55, B64). Further, in the optical axis of the second birefringent element 10b, the direction of projection onto the y-z plane is the direction from upper front toward lower rear, and thus the incident lights (B54, B63) following the fifth and the sixth optical paths (L5, L6) are emitted from the positions shifted downward, and reach the position of the second half-wave plate 30b (s25).

The second half-wave plate 30b lies only on the sixth optical path L6, and only the light B65 following the sixth optical path L6 out of the two outgoing lights (B56, B65) from the second birefringent element 10b is rotated 90 degrees in its direction of oscillation, and enters the second Faraday rotator 20b. That is, the light B56 oscillating in the y-axis direction and following the fifth optical path L5 and the light B66 oscillating in the x-axis direction and following the sixth optical path L6 enter the second Faraday rotator 20b (s26).

The second Faraday rotator 20b, similarly to the first Faraday rotator 20a, is configured to exchange each other the directions of oscillation of the incident lights (B56, B66) following the fifth and the sixth optical paths (L5, L6) and allow the lights to enter the third birefringent element 10c (s27).

The light B57 oscillating in the x-axis direction and following the fifth optical path L5 and the light B67 oscillating in the y-axis direction and following the sixth optical path enter the third birefringent element 10c. The optical axis 11c of the third birefringent element 10c is in the same direction as that of the first birefringent element 10a, and thus the incident light B57 oscillating in the x-axis direction is refracted to the right as extraordinary light B58. The incident light B67 oscillating in the y-axis direction travels, as it is, in a straight line as ordinary light B68. Thereby, the two lights (B57, B67), which have entered the third birefringent element 10c, are coupled at the position line-symmetrical to the second optical port P2 with respect to the x-axis. Then, the third optical port P3 is arranged behind this coupled position, and the optical path in the forward direction is formed from the first optical port P1 to the third optical port P3.

On the other hand, regarding the optical path in the reverse direction, as illustrated in FIGS. 4C and 4D, the light B7 emitted forward from the third optical port P3 is split into ordinary light B71 and extraordinary light B81 by the third birefringent element 10c. The ordinary light B71 oscillates in the y-axis direction orthogonal to the optical axis 11c of the third birefringent element 10c when viewed from the front, and the extraordinary light B81 oscillates in the x-axis direction in such a manner as to be parallel to the optical axis 11c. Then, the extraordinary light B81 is refracted and emitted from the position different from the position from which the ordinary light is emitted (s31, s32).

Hereinafter, the optical path that is and will be followed by the ordinary light B71 in the third birefringent element 10c is referred to as a seventh optical path L7, and the optical path that is and will be followed by the extraordinary light B81 is referred to as an eighth optical path L8. On the seventh optical path L7, the second Faraday rotator 20b, the second half-wave plate 30b, the second birefringent element 10b, the first Faraday rotator 20a, and the first birefringent element 10a are arranged in the order from the back to the front. On the eighth optical path L8, the second Faraday rotator 20b, the second birefringent element 10b, the first half-wave plate 30a, the first Faraday rotator 20a, and the first birefringent element 10a are arranged in the order from the back to the front.

As described above, in the on state, when the light oscillating in the x-axis or the y-axis direction enter either the first or the second Faraday rotator (20a, 20b), the light is rotated 90 degrees in its direction of oscillation and then emitted. Thus, similarly to the relationship between the third and the fourth optical paths (L3, L4) and the second and the first optical paths (L2, L1) in the off state, the seventh and the eighth optical paths (L7, L8) reversely follow the sixth and the fifth optical paths (L6, L5) in the forward direction, respectively. That is, the light B7 emitted from the third optical port P3 leads, through the seventh optical path L7 via the lights (B71-B77) and the optical path L8 via the lights (B81-B87), to the first birefringent element 10a (s31-s37).

Then, the light B77 oscillating in the x-axis direction and following the seventh optical path L7 is refracted to the first optical port P1 side as extraordinary light B78. The light B87 oscillating in the y-axis direction and following the eighth optical path L8 travels, as it is, in a straight line as ordinary light B88. Thereby, the ordinary light B88 and the extraordinary light B78 are coupled at the front end surface f1 of the first birefringent element 10a, and the coupled light B8 enters the first optical port P1, and the optical path in the reverse direction is formed between the third optical port P3 and the first optical port P1. That is, the optical switch 1 is configured to operate to interrupt the optical path between the first optical port P1 and the second optical port P2 and connect the optical path in both the forward and the reverse directions between the first optical port P1 and the third optical port P3, in the on state. As a matter of course, when the third optical port P3 is not provided, the optical switch 1 performs only connection and interruption of the optical path in both the directions between the first optical port P1 and the second optical port P2.

In the optical switch 1 according to the present embodiment as described above, the first and the second Faraday rotators (20a, 20b) are magnetically saturated in the x-axis direction orthogonal to the optical path. Thereby, in the off state, even if linearly-polarized light passes through either the first and/or the second Faraday rotator (20a, 20b), the plane of the polarized light is not rotated, and the two Faraday rotators (20a, 20b), which are nonreciprocal elements, do not operate as nonreciprocal elements apparently. In this case, the light incident on the second birefringent element 10b on the optical path enters the element as ordinary light in both the forward and the reverse directions, and is emitted with the direction of oscillation and the position of the incident light on the x-y plane being maintained. As a result, the optical paths are formed which follow the same route in the forward and the reverse directions between the first optical port P1 and the second optical port P2 (L1 and L4, L2 and L3), thereby enabling the switching operation in both the directions.

On the other hand, in the first and the second Faraday rotators (20a, 20b), when the external magnetic field 24 in the z-axis direction along the optical path is applied to the Faraday element 21, the polarization plane of the linearly-polarized light passing through the rotator is rotated 90 degrees. In this case, the light incident on the second birefringent element 10b enters as extraordinary light in both the forward and the reverse directions. Thereby, the optical path is shifted downward in the forward direction, and the optical path is shifted upward in the reverse direction. As a result, the light B5 in the forward direction emitted from the first optical port P1 enters the third optical port P3 which is arranged at the position symmetrical to the second optical port P2 with respect to the x-axis, and the light B7 in the reverse direction emitted from the third optical port P3 follows the same optical path as that in the forward direction and enters the first optical port P1. Thereby, bidirectional communication is enabled with the pairs of the optical ports (P1-P2, P1-P3), arranged at the front and the back, being switched.

As such, according to the optical switch 1 of the embodiment of the present disclosure, a mechanical optical switch which has been in the mainstream in the bidirectional optical communication use can be replaced with a magneto-optic optical switch which uses a Faraday rotator without a movable part. Thereby, a bidirectional optical switch with less failure and deterioration and higher reliability can be implemented. Further, the rapid response of the Faraday rotator enables instantaneous connection, interruption, and switching of optical paths, thereby being able to improve the reliability of the optical communication as a whole.

Other Embodiments

As a matter of course, in the optical switch 1 according to the above described embodiment, the directions of the front, back, up, down, left, and right, and x, y and z axes are defined, but this is to define the directions and the relative positional relationship among the optical components for convenience sake, and thus, as long as the relative positional relationship is consistent, the optical switch may be arranged in any manner in a space.

The optical switch 1 according to the above described embodiment may be the so-called free space type in which various optical components configuring the switch are individually arranged in a space, and also may be the so-called pigtail type in which various optical components are housed in an integral housing connected to an optical fiber collimator.

The present disclosure includes providing an optical switch capable of performing bidirectional switching using a Faraday rotator having high-speed responsivity, reliability and durability.

The embodiment of the present disclosure can be utilized, for example, for an optical communication technique.

The above embodiments of the present disclosure are simply for facilitating the understanding of the present disclosure and are not in any way to be construed as limiting the present disclosure. The present disclosure may variously be changed or altered without departing from its spirit and encompass equivalents thereof.

What is claimed is:

1. An optical switch comprising:
a first birefringent element;
a first Faraday rotator including a Faraday element made of a magneto-optical material, two permanent magnets, and an electromagnet;
a first half-wave plate;
a second birefringent element;
a second half-wave plate;
a second Faraday rotator including a Faraday element made of a magneto-optical material, two permanent magnets, and an electromagnet; and
a third birefringent element, wherein
the first birefringent element, the first Faraday rotator, the first half-wave plate, the second birefringent element, the second half-wave plate, the second Faraday rotator, and the third birefringent element, each having light-incident/emission end surfaces at front and back thereof, are arranged in this order on an optical path in a forward direction from front to back,
the first birefringent element and the third birefringent element are arranged such that optical axes thereof extend from left front toward right rear, and the second birefringent element is arranged such that an optical axis thereof extends from upper front toward lower rear, when relative up-down and left-right directions, orthogonal to a front-back direction, are defined,
the two permanent magnets each in a plate shape are respectively mounted to left and right side surfaces of the Faraday element such that different magnetic poles are opposed to each other, and the permanent magnets are configured to apply a permanent magnetic field to the Faraday element in one of a left direction and a right direction,
the electromagnet is configured to apply an external magnetic field to the Faraday element in one of a front direction and a back direction,
the first birefringent element is configured to, when a light beam in the forward direction from a first optical port, arranged in front of the first birefringent element, is made incident on a first position in the front end surface thereof, split the light beam into ordinary light and extraordinary light in left and right directions; emit a light beam corresponding to the ordinary light onto a first optical path; and emit a light beam corresponding to the extraordinary light onto a second optical path,
the third birefringent element is configured to, when a light beam in a reverse direction from a second optical port, arranged behind the third birefringent element, is made incident on a second position in the back end surface thereof, split the light beam into ordinary light and extraordinary light in the left and right directions; emit a light beam corresponding to the ordinary light onto the second optical path; and emit a light beam corresponding to the extraordinary light onto the first optical path, the first half-wave plate is arranged on the first optical path, the second half-wave plate is arranged on the second optical path, the first Faraday rotator and the second Faraday rotator each are configured to emit a light beam, incident thereon from one of the forward direction and the reverse direction, without rotating a polarization plane of the light beam, in an off state in which an external magnetic field in one of the front direction and the back direction produced by the electromagnet is not being applied to the Faraday element; and emit a light beam, incident thereon from one of the forward direction and the reverse direction, with a polarization plane of the light beam having been rotated 90 degrees in one of a left direction and a right direction around an axis along the front-back direction, in an on state in which the external magnetic field in one of the front direction and the back direction is being applied to the Faraday element, in the off state, the light beams respectively following the first optical path and the second optical path in the forward direction are coupled at the second position and enter the second optical port, and the light beams respectively following the first optical path and the second optical path in the reverse direction are coupled at the first position and enter the first optical port, so that a bidirectional optical path is formed between the first optical port and the second optical port, and in the on state, the light beams respectively following the first optical path and the second optical path in the forward direction are coupled at a third position different from the second position, and the optical path between the first optical port and the second optical port is interrupted.

2. The optical switch according to claim 1, wherein in the on state, the light beam in the forward direction from the first optical port enters a third optical port arranged behind the third position of the third birefringent element, and a light beam in the reverse direction from the third optical port enters the first optical port, so that a bidirectional optical path is formed between the first optical port and the third optical port.

3. The optical switch according to claim 1, wherein the Faraday element is configured such that an even number of magneto-optical crystal films are laminated in the front-back direction, and the magneto-optical crystal films adjacent to each other are laminated in such a manner as to have crystal faces forming 180 degrees with respect to each other.

4. The optical switch according to claim 2, wherein the Faraday element is configured such that an even number of magneto-optical crystal films are laminated in the front-back direction, and the magneto-optical crystal films adjacent to each other are laminated in such a manner as to have crystal faces forming 180 degrees with respect to each other.

* * * * *